United States Patent
Lin et al.

(10) Patent No.: US 9,519,817 B1
(45) Date of Patent: Dec. 13, 2016

(54) METHOD FOR DIGITIZING BARCODE IMAGE BY USING DYNAMIC THRESHOLD

(71) Applicants: BenQ CO., LTD., Changning District, Shanghai (CN); QISDA CORPORATION, Taoyuan (TW)

(72) Inventors: Chi-Cheng Lin, Taoyuan (TW); Tsung-Hsi Lee, Tainan (TW)

(73) Assignees: BenQ CO., LTD., Shanghai (CN); QISDA CORPORATION, Taoyuan (TW)

( * ) Notice: Subject to any disclaimer, the term of this patent is extended or adjusted under 35 U.S.C. 154(b) by 0 days.

(21) Appl. No.: 15/241,047

(22) Filed: Aug. 18, 2016

(51) Int. Cl.
 *G06K 7/14* (2006.01)
(52) U.S. Cl.
 CPC ........... *G06K 7/1452* (2013.01); *G06K 7/1417* (2013.01); *G06K 7/1486* (2013.01)
(58) Field of Classification Search
 CPC .. G06K 7/1452; G06K 7/1417; G06K 7/1486; G06K 7/146; G06K 7/1469; G06K 7/1478
 See application file for complete search history.

(56) References Cited

U.S. PATENT DOCUMENTS

| | | | | |
|---|---|---|---|---|
| 5,155,343 A | * | 10/1992 | Chandler | ........... G06K 7/10871 235/454 |
| 2005/0145698 A1 | * | 7/2005 | Havens | .................... G06K 7/14 235/462.12 |

* cited by examiner

*Primary Examiner* — Suezu Ellis
(74) *Attorney, Agent, or Firm* — Winston Hsu; Scott Margo (57) ABSTRACT

After capturing a barcode image, generate at least one sample line accordingly, acquire sample data of the at least one sample line, generate a first and a second reference lines, generate an upper bound and a lower bound according to the first and the second reference lines, generate a first curve by interpolating all sample points, generate a plurality of effective sample shapes of the first curve according to the upper bound and the lower bound, identify an internal point of each effective sample shape, generate a second curve by interpolating all internal points, and digitize the barcode image to binary data by comparing sample data with the second curve.

20 Claims, 13 Drawing Sheets

METHOD FOR DIGITIZING BARCODE IMAGE BY USING DYNAMIC THRESHOLD

BACKGROUND OF THE INVENTION

1. Field of the Invention

The present invention illustrates a method for digitizing a barcode image, and more particularly, a method for digitizing a barcode image by using a dynamic threshold.

2. Description of the Prior Art

With the advancement of technology, several identification codes are adopted in our daily life. For example, barcode technology is popularly used in commercial products, industrial products, and financial markets. Barcodes are used to identify the products in a supermarket, books in a library, machines in a factory, bank invoices, and employee badges in a company, etc. In general, barcodes represent unique information via the widths of bars and spaces therebetween. These barcodes have only one dimension and are known as one-dimensional barcodes or linear-based barcodes, such as EAN-13 Code, Code 128, and Code 39. More recently emerged barcodes capable of storing information in vertical dimension and horizontal dimension are called two-dimensional barcodes. They can store a lot more information. These two-dimensional barcodes could be QR Code, PDF417 or Code 49.

To perform reading operation of the barcode, an optical reader such as a scanner or barcode reader is used for capturing a barcode image and extracting information encrypted in the barcode image. In general, the optical reader is required to tilt an optical axis of irradiation projected onto the barcode to an angle perpendicular to the barcode so as to prevent a reading error caused by diffused reflection from the barcode. After the optical reader reads the pattern of bars and spaces of the barcode image, the optical reader can extract information by decrypting the pattern of bars and spaces of the barcode image accordingly.

In general, the capturing of a barcode image by an optical reader may be associated with a noise effect, image shaky effect, and blur effect. Thus, conventional optical reader may enhance the barcode image before the barcode image is digitized for extracting information. However, the enhancement of barcode image for increasing the accuracy of digitization is complex and requires a large processing time. Further, when a detection error of digitization occurs, an error propagation effect may occur, leading to increased decoding error rate.

SUMMARY OF THE INVENTION

In an embodiment of the present invention, a method for digitizing a barcode image is disclosed. The method comprises capturing the barcode image by using an image sensor, generating at least one sample line according to the barcode image, acquiring sample data of the at least one sample line, generating a first reference line, generating a second reference line according to the sample data, generating an upper bound of the second reference line according to the a difference between the first reference line and the second reference line and a first multiplier factor, generating a lower bound of the second reference line according to the difference between the first reference line and the second reference line and a second multiplier factor, generating a first curve by interpolating all sample points of the sample data, generating a plurality of effective sample shapes of the first curve according to the upper bound and the lower bound of the second reference line, identifying an internal point of each effective sample shape, generating a second curve by interpolating all internal points, and digitizing the barcode image to binary data by comparing the sample data with the second curve.

Another embodiment of the present invention discloses a system for digitizing a barcode image. The system comprises an image sensor, a memory, an output device, and a processor. The image sensor is configured to capture the barcode image. The memory is configured to save sample data. The processor is coupled to the image sensor, the memory, and the output device and configured to process the barcode image. After the barcode image is captured by the image sensor, the processor generates at least one sample line according to the barcode image. The processor acquires the sample data of the at least one sample line and saves the sample data to the memory. The processor generates a first reference line. The processor generates a second reference line according to the sample data. The processor generates an upper bound of the second reference line according to a difference between the first reference line and the second reference line and a first multiplier factor. The processor generates a lower bound of the second reference line according to the difference between the first reference line and the second reference line and a second multiplier factor. The processor generates a first curve by interpolating all sample points of the sample data. The processor generates a plurality of effective sample shapes of the first curve according to the upper bound and the lower bound of the second reference line. The processor identifies an internal point of each effective sample shape. The processor generates a second curve by interpolating all internal points. The processor digitizes the barcode image to binary data by comparing the sample data with the second curve. The processor decodes the binary data and controls the output device to output the decoded data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
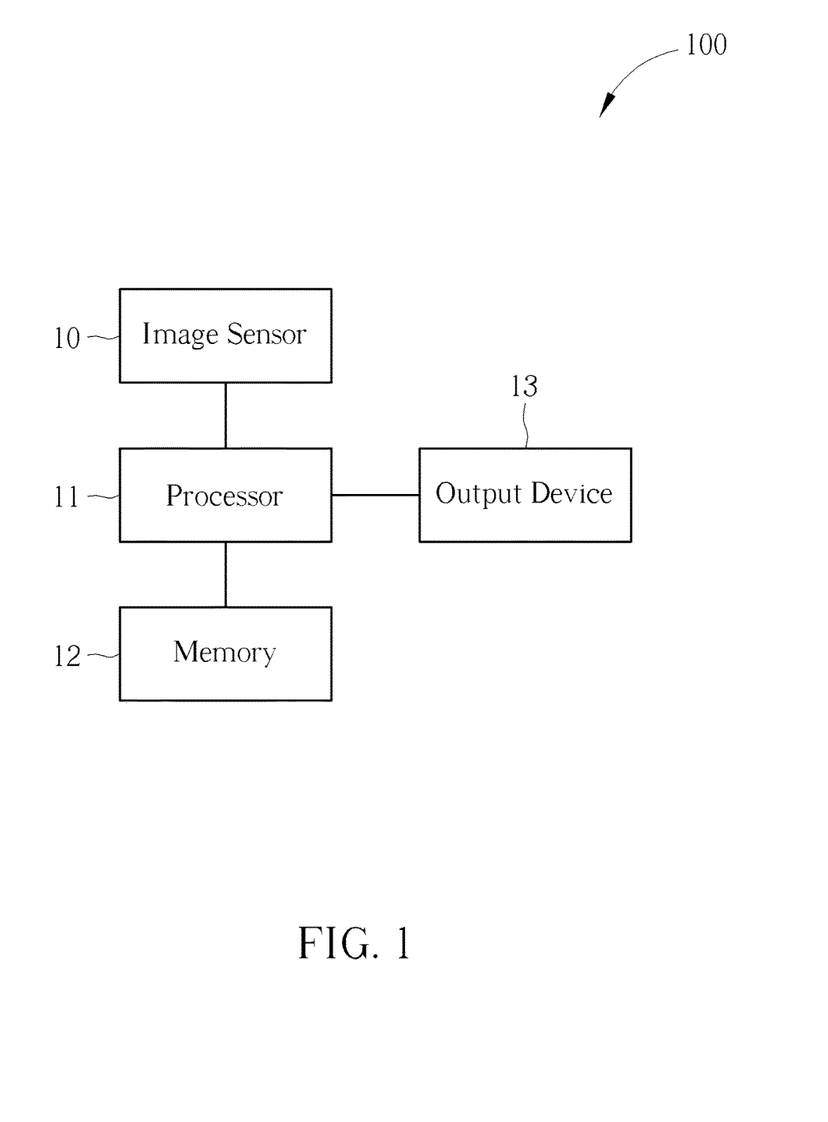
FIG. 1 is a block diagram of a system for digitizing a barcode image.

FIG. 1 is a block diagram of a system 100 for digitizing a barcode image. The system 100 can include an image sensor 10, a processor 11, a memory 12, and an output device 13. The image sensor 10 is configured to capture the barcode image. The image sensor 10 can be an optical reading device, an infrared sensor, a single-line laser scanner, a lens with a charge-coupled device, or a lens with a complementary metal-oxide-semiconductor. The memory 12 is configured to save sample data of the barcode image. The memory 12 can be a random access memory, a non-volatile memory or a hard disk. The output device 13 is configured to output decoded data with respect to the barcode image. The output device 13 can be a communication unit, such as a universal serial bus port, a Bluetooth transceiver, or a Wi-Fi transceiver. The processor 11 is coupled to the image sensor 10, the memory 12, and the output device 13 for processing the barcode image. The processor 11 can be a control unit, a central processing unit, a micro-processing unit, or any programmable device. Specifically, the processor 11 can use any device for communicating data to the image sensor 10, the memory 12, and the output device 13. For example, the processor 11 can use a wired cable or an input/output control bus (I/O control bus) for communicating data to the image sensor 10, the memory 12, and the output device 13. For digitizing the barcode image, some programming functions can be introduced to the processor 11. For example, a programming function of image capture can be introduced to the processor 11 for driving and controlling the image sensor 10 to capture the barcode image. A programming function of barcode location identification can be introduced to the processor 11 for detecting a position of barcode. A programming function of image processing can be introduced to the processor 11 for enhancing the barcode image and performing a digitizing process. A programming function of one-dimension/two-dimension barcode decoder can be introduced to the processor 11 for extracting data from the barcode image and performing an error correction process. Here, the barcode of the barcode image can be Code 39, Code 128, GSI Code, quick response code, data matrix, or PDF147. However, the system 100 is not limited to identify aforementioned codes. A method for digitizing the barcode image of the system 100 is illustrated below.

Figure 2:
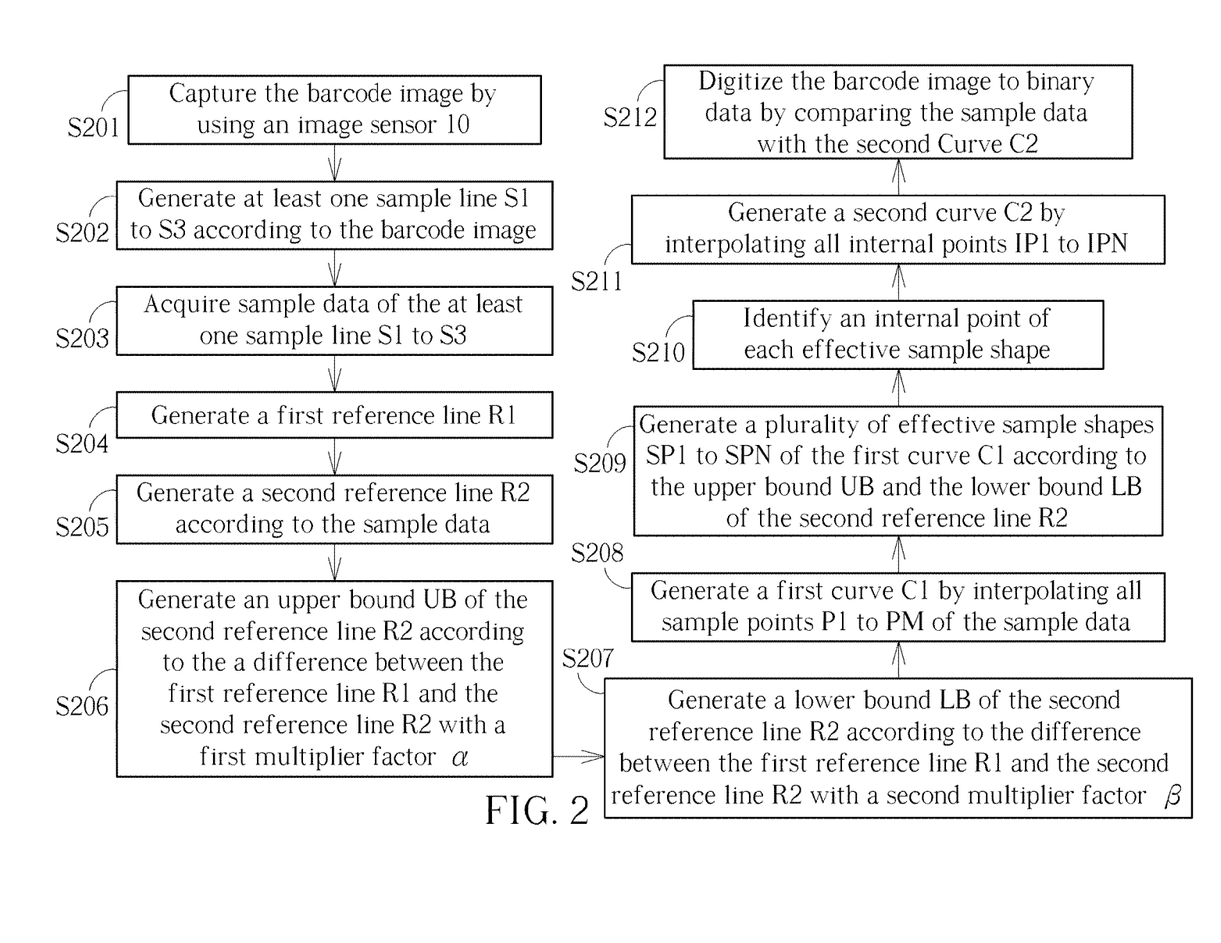
FIG. 2 is a flow chart of the method for digitizing the barcode image of the system in FIG. 1.

FIG. 2 is a flow chart of the method for digitizing the barcode image of the system 100. FIG. 3 to FIG. 10 are introduced to assist the illustrations of the flow chart in FIG. 2. The method for digitizing the barcode image includes step S201 to step S212. Specifically, the sequence of steps of the method is not limited to step S201 to step S212. For example, step S211 can be executed before step S204. Steps of the method for digitizing the barcode image can be presented below.

step S201: The barcode image is captured by the image sensor 10;

step S202: The processor 11 generates at least one sample line S1 to S3 according to the barcode image;

step S203: The processor 11 acquires the sample data of the at least one sample line S1 to S3 and saves the sample data to the memory 12;

step S204: The processor 11 generates a first reference line R1;

step S205: The processor 11 generates a second reference line R2 according to the sample data;

step S206: The processor 11 generates an upper bound UB of the second reference line R2 according to the difference between the first reference line R1 and the second reference line R2 and a first multiplier factor $\alpha$;

step S207: The processor 11 generates a lower bound LB of the second reference line R2 according to the difference between the first reference line R1 and the second reference line R2 and a second multiplier factor $\beta$;

step S208: The processor 11 generates a first curve C1 by interpolating all sample points P1 t PM of the sample data;

step S209: The processor 11 generates a plurality of effective sample shapes SP1 to SPN of the first curve C1 according to the upper bound UB and the lower bound LB of the second reference line R2;

step S210: The processor 11 identifies an internal point of each effective sample shape;

step S211: The processor 11 generates a second curve C2 by interpolating all internal points IP1 to IPN;

step S212: The processor 11 digitizes the barcode image to binary data by comparing the sample data with the second curve C2.

Figure 3A:
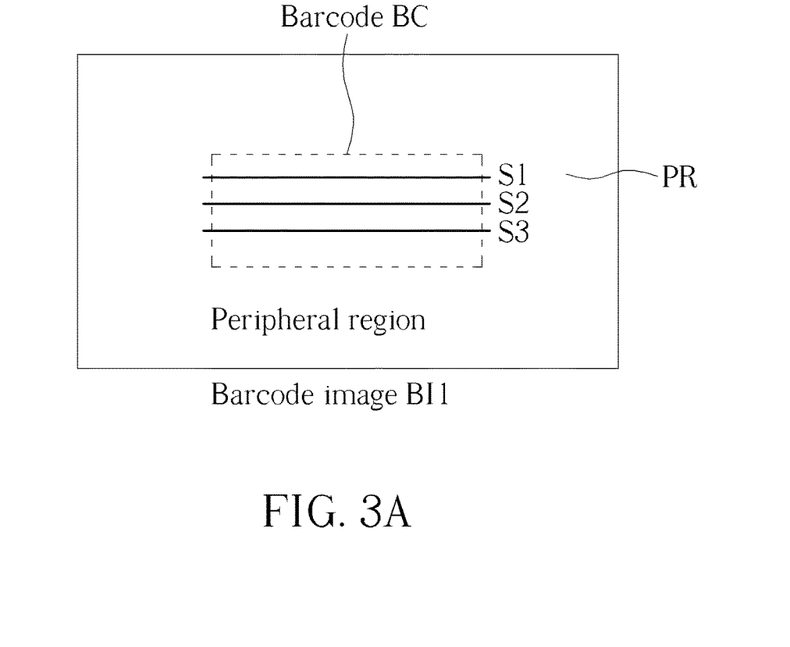
FIG. 3A is schematic diagram of the barcode image in conjunction with at least one sample line when the locations of the barcode portion and the peripheral region are successfully identified.
Figure 3B:
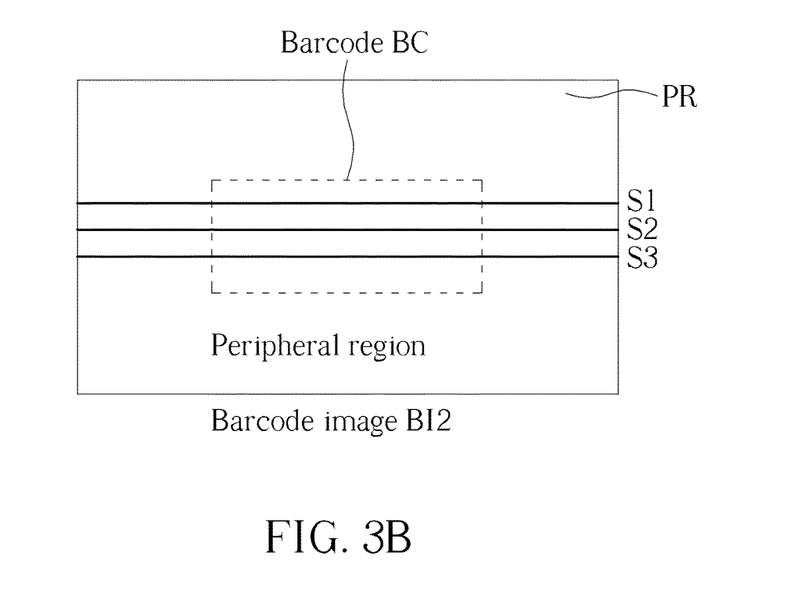
FIG. 3B is schematic diagram of the barcode image in conjunction with at least one sample line when the locations of the barcode portion and the peripheral region are unidentified.

The detail illustration of each step is written below. In step S201, the barcode image is captured by the image sensor 10. Without loss of generality, the barcode image captured by the image sensor 10 can be considered as a blurred barcode image with noise interference. After the barcode image is captured by the image sensor 10, the processor 11 generates at least one sample line S1 to S3 according to the barcode image in step S202. FIG. 3A and FIG. 3B show schematic diagrams of the barcode image in conjunction with at least one sample line S1 to S3. Specifically, the barcode image includes a barcode portion BC and a peripheral region PR. In step S202, the processor 11 detects and identifies positions of the barcode portion BC and the peripheral region PR first. If the positions of the barcode portion BC and the peripheral region PR can be successfully identified, the processor 11 generates sample lines S1 to S3 within the barcode portion BC of the barcode image BI1 in FIG. 3A. If the positions of the barcode portion BC and the peripheral region PR cannot be identified, the processor 11 generates sample lines S1 to S3 across the barcode image BI2 in FIG. 3B. Some factors can affect the accuracy of the position identification, such as ambient light and sensitivity of the image sensor 10. In step S203, the processor 11 acquires the sample data of the at least one sample line S1 to S3 and saves the sample data to the memory 12. Here, each sample line includes a plurality of sample points. Each sample point corresponds to a gray level of the peripheral region PR, a gray level of a bar of the barcode portion BC, or a gray level of a space of the barcode portion BC. Specifically, the sample data can include the gray levels of all sample points and can be saved to the memory 12 for statistical analysis.

Figure 4:
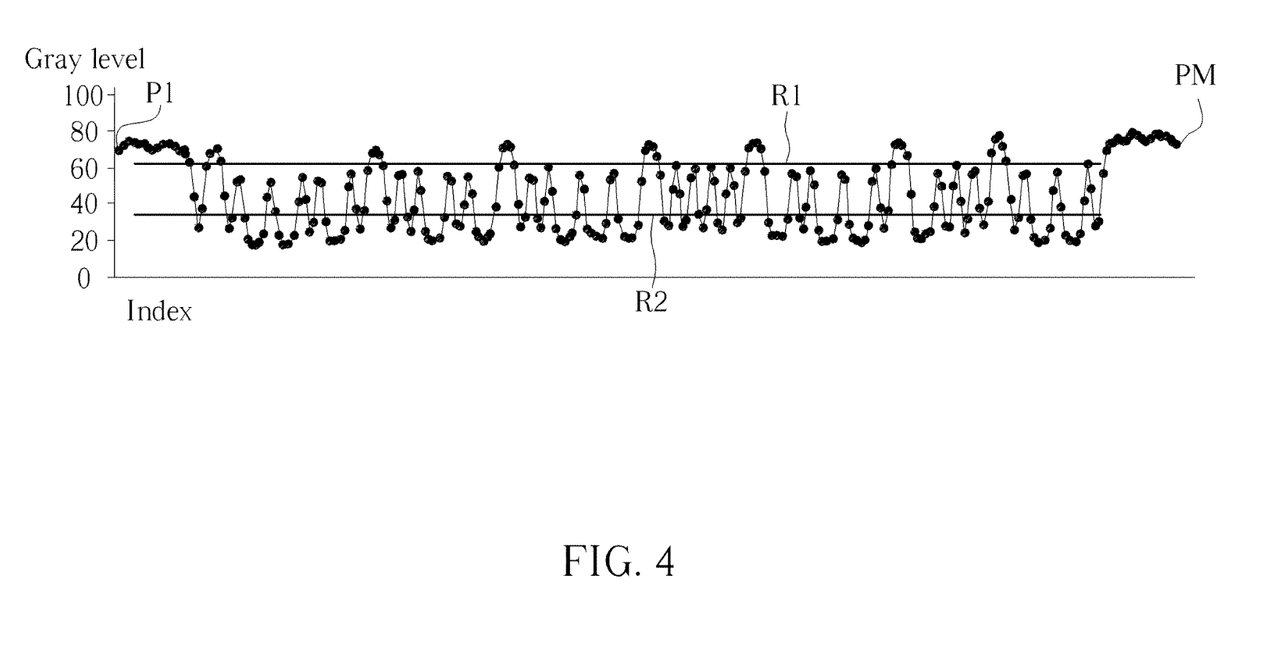
FIG. 4 is a schematic diagram of a correlation between a first reference line, a second reference line, and all sample points.

In step S204, the processor 11 generates a first reference line R1. FIG. 4 shows a schematic diagram of a correlation between the first reference line R1 and all sample points P1 to PM. In FIG. 4, Y-axis is denoted as a gray level scale. X-axis is denoted as an index of each sample point. Specifically, if the positions of the barcode portion BC and the peripheral region PR are unidentified (i.e., as shown in FIG. 3B), the processor 11 can generate the first reference line R1 by averaging gray levels of sample points with higher gray levels. For example, in step S204, the first reference line R1 is a gray level averaged from sample points having gray levels in top 25% of the sample points P1 to PM. In other words, since sample points having gray levels in top 25% of the sample points P1 to PM should be white, the value of the first reference line R1 can be regarded as a user-defined "white" gray level. If the positions of the barcode portion BC and the peripheral region PR are successfully identified (i.e., as shown in FIG. 3A), the first reference line R1 can be generated according to gray levels of sample points near both terminals of the sample lines S1 to S3. For example, in step S204, the first reference line R1 can have a value equal to 70% of mean of gray levels of sample points P1 and PM corresponding to the peripheral region PR. However, generation of the first reference line R1 is not limited by using aforementioned algorithm. For example, if the positions of the barcode portion BC and the peripheral region PR are unidentified, the first reference line R1 can also be generated according to gray levels of sample points near both terminals of the sample lines S1 to S3 when the terminals of the sample lines S1 to S3 are located on the white peripheral region.

Figure 5:
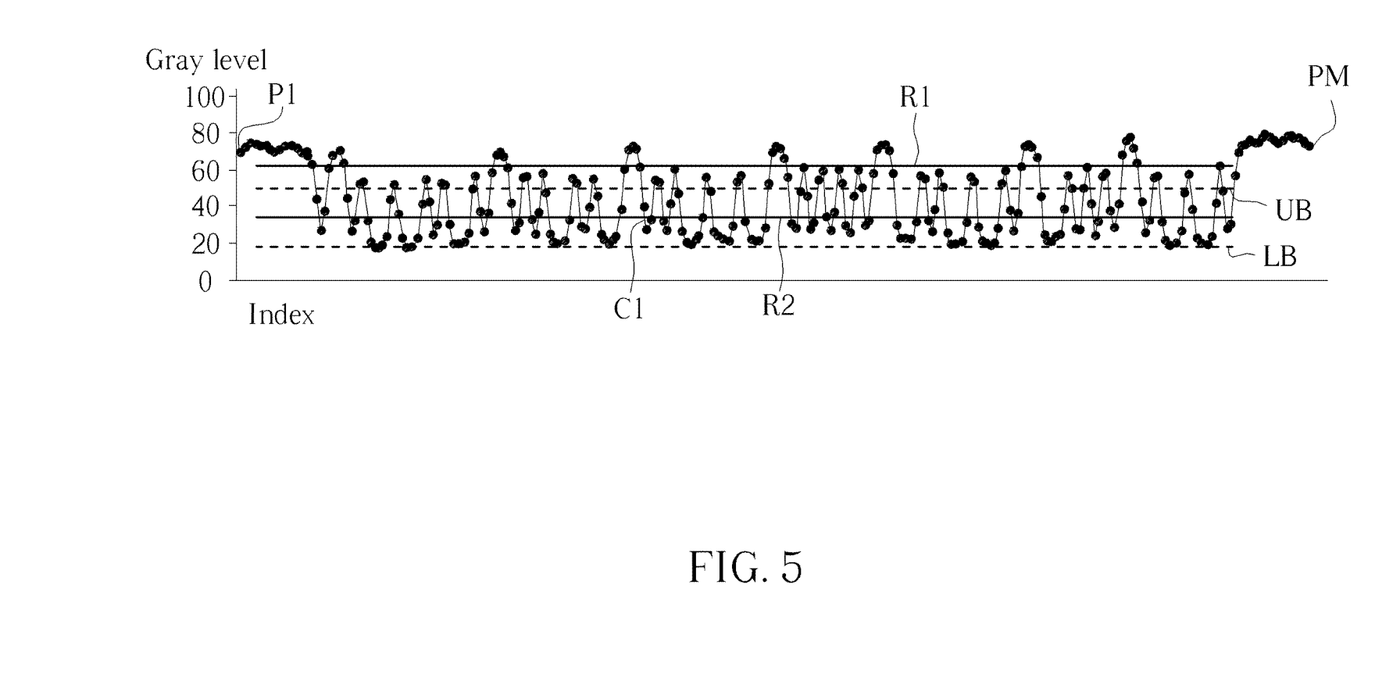
FIG. 5 shows a schematic diagram of a correlation between the first reference line, the second reference line, an upper bound, and a lower bound.

In step S205, the processor 11 generates the second reference line R2 according to the sample data. FIG. 4 also shows a schematic diagram of a correlation between the second reference line R2 and all sample points P1 to PM. Here, the second reference line R2 is generated according to an average of the gray levels of all sample points P1 to PM. In other words, a value of the second reference line R2 can be regarded as a mean of gray levels. Specifically, the first reference line R1 and the second reference line R2 are two linear and deterministic lines generated according to the gray levels. Then, in step S206, the processor 11 generates the upper bound UB of the second reference line R2 according to the difference between the first reference line R1 and the second reference line R2 and a first multiplier factor $\alpha$. FIG. 5 shows a schematic diagram of a correlation between the first reference line R1, the second reference line R2, and the upper bound UB. Specifically, the value of the upper bound UB is denoted as UBV. The value of the first reference line R1 is denoted as L1. The value of the second reference line R2 is denoted as L2. The value UBV can be written as $$UBV=L2+\alpha \times (L1-L2)$$

wherein the value UBV is greater than the value L2 and smaller than the value L1. The first multiplier factor $\alpha$ is a positive value smaller than one. The first multiplier factor $\alpha$ can be a user-defined parameter. Thus, the upper bound UB is between the first reference line R1 and the second reference line R2. In other words, the value UBV of the upper bound UB can be regarded as the sum of the value L2 of the second reference line R2 and a proportional value of (L1−L2). For example, the value UBV of the upper bound UB can be defined as UBV=L2+0.5×(L1−L2) when the first multiplier factor $\alpha$ is 0.5.

In step S207, the processor 11 generates the lower bound LB of the second reference line R2 according to the difference between the first reference line R1 and the second reference line R2 and a second multiplier factor $\beta$. FIG. 5 also shows a schematic diagram of a correlation between the first reference line R1, the second reference line R2, and the lower bound LB. Specifically, the value of the lower bound LB is denoted as LBV. The value of the first reference line R1 is denoted as L1. The value of the second reference line R2 is denoted as L2. The value LBV can be written as $$LBV=L2-\beta \times (L1-L2)$$

wherein the value LBV is smaller than the value L2, the value L1, and the value UBV. The second multiplier factor $\beta$ is a positive value smaller than one. The second multiplier factor $\beta$ can be a user-defined parameter. Thus, the lower bound LB is lower than the first reference line R1, the second reference line R2, and the upper bound UB. In other words, the value LBV of the lower bound LB can be regarded as the value L2 of the second reference line R2 deducted by a proportional value of (L1−L2). For example, the value LBV of the lower bound LB can be defined as LBV=L2−0.5×(L1−L2) when the second multiplier factor $\beta$ is 0.5.

Figure 6A:
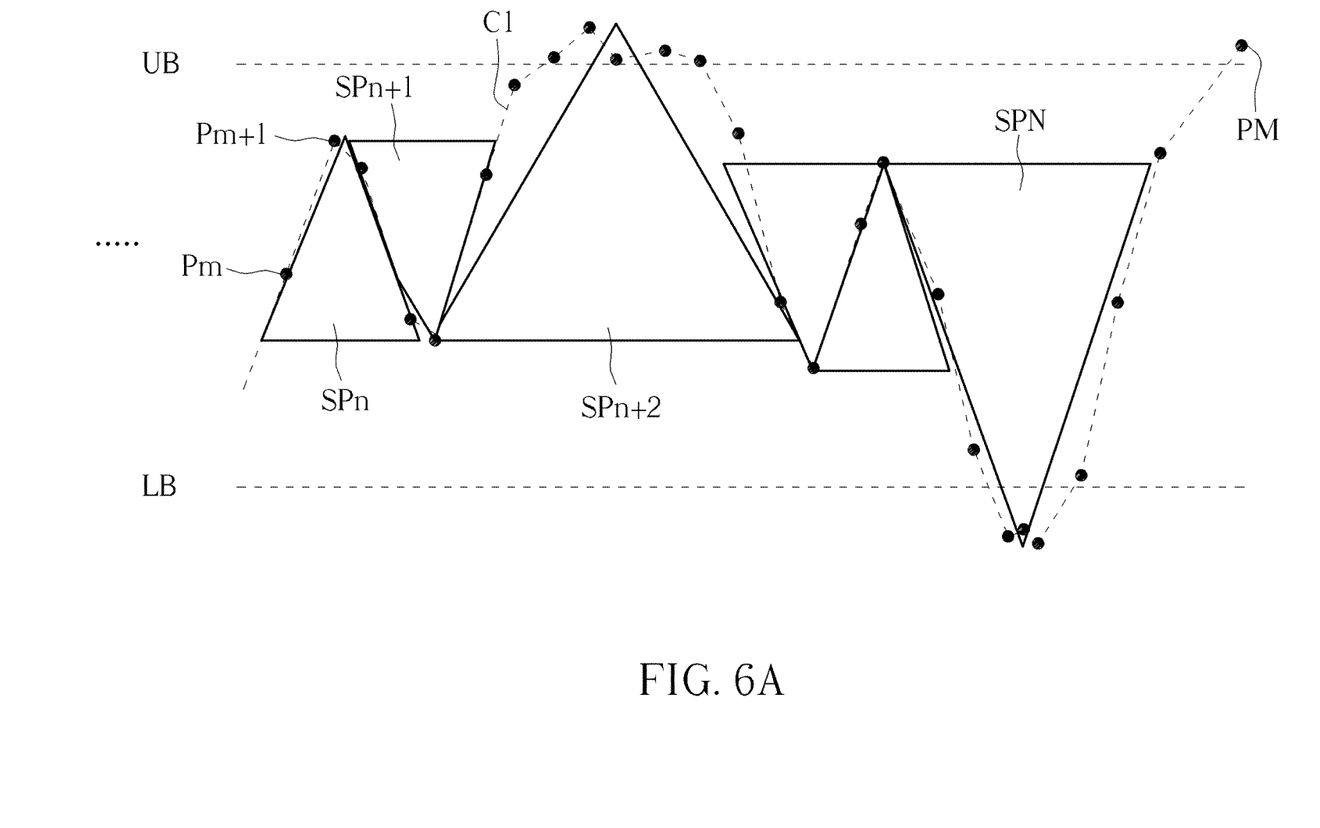
FIG. 6A is a schematic diagram of correlations between effective sample shapes and a first curve.

In step S208, the processor 11 generates a first curve C1 by interpolating all sample points P1 to PM of the sample data. Here, the interpolation process can be a linear interpolation process or a non-linear interpolation process. FIG. 5 also shows the first curve C1 generated by interpolating all sample points P1 to PM. Specifically, the first curve C1 can be a linear curve generated by the linear interpolation process. The first curve C1 can also be a non-linear curve generated by a cubic interpolation, a polynomial interpolation, or a spline interpolation. For presentation simplicity, the first curve C1 here is considered as the linear curve in the system 100. In step S209, the processor 11 generates a plurality of effective sample shapes SP1 to SPN of the first curve C1 according to the upper bound UB and the lower bound LB of the second reference line R2. FIG. 6A shows a schematic diagram of correlations between effective sample shapes and the first curve C1. In FIG. 6A, the effective sample shapes SPn to SPN are triangles for fitting the first curve C1. However, the effective sample shapes in step S209 can be polygons to improve fitting accuracy. Specifically, the effective sample shapes SPn to SPN can be categorized as convex-based sample shapes and concave-based sample shapes. The generation of the effective sample shapes is illustrated below.

Figure 6B:
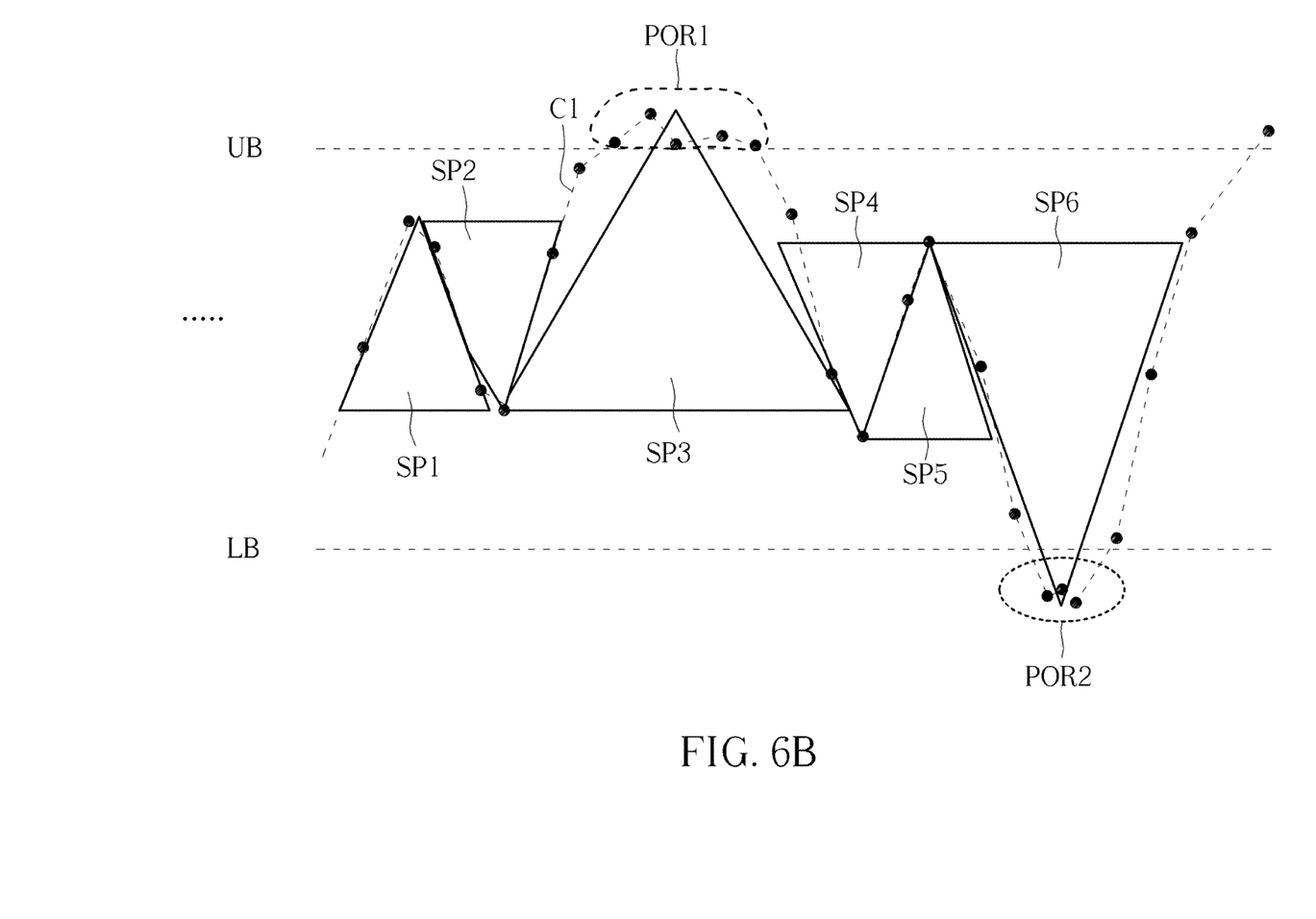
FIG. 6B is a simplified illustration of FIG. 6A.
Figure 6C:
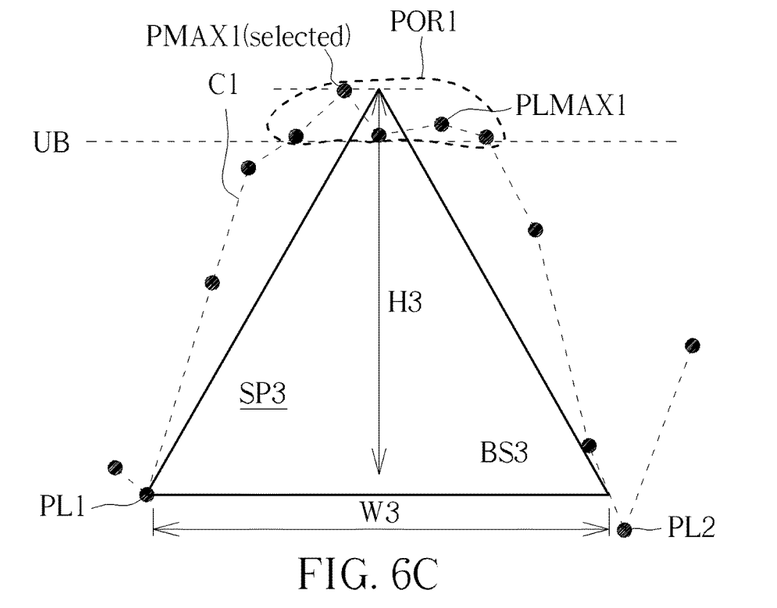
FIG. 6C illustrates the generation of the effective sample shape when the portion of the first curve is greater than the upper bound.

FIG. 6B is a simplified illustration of FIG. 6A. Here, for simplicity, only the effective sample shapes SP1 to SP6 are considered. Specifically, effective sample shapes SP1, SP3, and SP5 are convex-based sample shapes. Effective sample shapes SP2, SP4, and SP6 are concave-based sample shapes. Moreover, a portion POR1 of the first curve C1 is greater than the upper bound UB. A portion POR2 of the first curve C1 is lower than the lower bound LB. The rest portion of the first curve C1 is between the upper bound UB and the lower bound LB. The generation of the effective sample shapes SP1 to SP6 satisfies the following rules. FIG. 6C illustrates the generation of the effective sample shape SP3 when the portion POR1 of the first curve C1 is greater than the upper bound UB. When the effective sample shape SP3 is to be generated as a convex-based sample shape and the portion POR1 of the first curve C1 is greater than the upper bound UB, within the portion POR1 only a maximum sample point PMAX1 is selected to generate the effective sample shape SP3. For example, in FIG. 6C, the portion POR1 has two local maximum sample points PMAX1 and PLMAX1. Specifically, the sample point PMAX1 is also a global maximum sample point within the portion POR1 since the value of the sample point PMAX1 is greater than the value of the sample point PLMAX1. Thus, the sample point PMAX1 is selected to generate the effective sample shape SP3. In other words, the value of the sample point PMAX1 is equal to a top vertex value of the sample shape SP3. Since only one sample point (i.e., maximum sample point) within the portion POR1 (i.e., greater than the upper bound UB) is selected, no redundant sample shape is introduced, leading to noise reduction. Particularly, when the effective sample shape SP3 is a convex-based sample shape and the portion POR1 of the first curve C1 is greater than the upper bound, a height H3 is a vertical distance between the sample point PMAX1 and a base BS3 horizontally extended from a sample point PL1. The sample point PL1 is one which has a higher value of two local minimum sample points PL1 and PL2 lower than the upper bound UB and right beside the sample point PMAX1. A width W3 is the length of the base BS3.

Figure 6D:
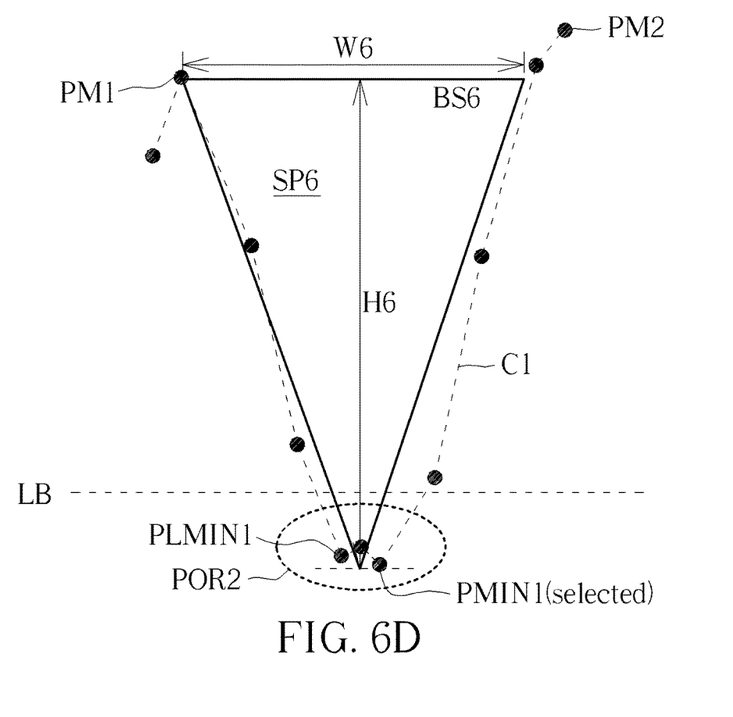
FIG. 6D illustrates the generation of the effective sample shape when a portion of the first curve is lower than the lower bound.

FIG. 6D illustrates the generation of the effective sample shape SP6 when a portion POR2 of the first curve C1 is lower than the lower bound LB. When an effective sample shape SP6 is to be generated as a concave-based sample shape and the portion POR2 of the first curve C1 is lower than the lower bound LB, within the portion POR2 only a minimum sample point PMIN1 is selected to generate the effective sample shape SP6. For example, in FIG. 6D, the portion POR2 has two local minimum sample points PLMIN1 and PMIN1. Specifically, the sample point PMIN1 is also a global minimum sample point within the portion POR2 since the value of the sample point PMIN1 is smaller than the value of the sample point PLMIN1. Thus, the sample point PMIN1 is selected to generate the effective sample shape SP6. In other words, the value of the sample point PMIN1 is equal to a bottom vertex value of the sample shape SP6. Since only one sample point (i.e., minimum sample point) within the portion POR2 (i.e., lower than the lower bound LB) is selected, no redundant sample shape is introduced, leading to noise reduction. Particularly, when the effective sample shape SP6 is a concave-based sample shape and the portion POR2 of the first curve C1 is lower than the lower bound LB, a height H6 is a vertical distance between the sample point PMIN1 and a base BS6 horizontally extended from a sample point PM1. The sample point PM1 is one which has a lower value of two local maximum sample points PM1 and PM2 higher than the lower bound LB and right beside the sample point PMIN1. A width W6 is the length of the base BS6.

Figure 6E:
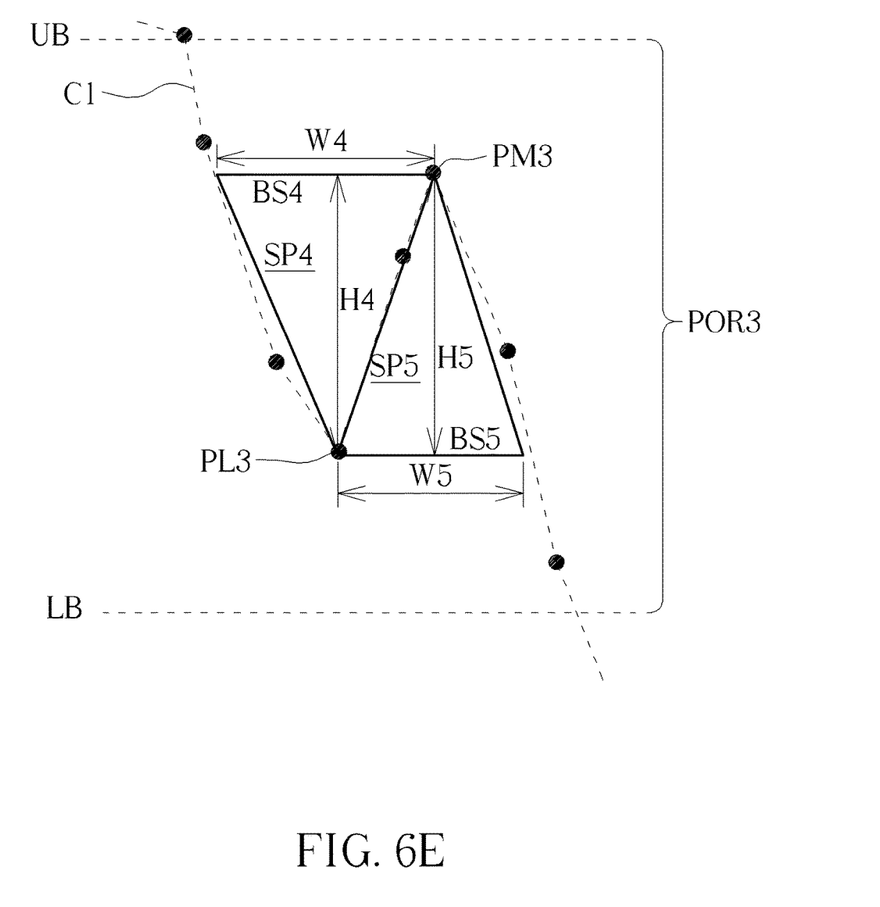
FIG. 6E illustrates the generation of the effective sample shapes when a portion of the first curve is between the upper bound and the lower bound.

FIG. 6E illustrates the generation of the effective sample shapes SP4 and SP5 when a portion POR3 of the first curve C1 is between the upper bound UB and the lower bound LB. Here, only local maximum sample points and local minimum sample points are selected to generate effective sample shapes SP4 and SP5. For example, a local maximum sample point PM3 is selected to generate a convex-based sample shape SP5. A local minimum sample point PL3 is selected to generate a concave-based sample shape SP4. Specifically, when the effective sample shape SP4 is the concave-based sample shape, the height H4 is a vertical distance between the local minimum sample point PL3 and a base BS4 horizontally extended from a local maximum sample point PM3. The width W4 is the length of the base BS4. When the effective sample shape SP5 is a convex-based sample shape, the height H5 is a vertical distance between the local maximum sample point PM3 and a base BS5 horizontally extended from a local minimum sample point PL3. The width W5 is the length of the base BS5. And so on, all effective sample shapes can be generated by following the rules illustrated in FIG. 6C, FIG. 6D, and FIG. 6E.

Figure 7A:
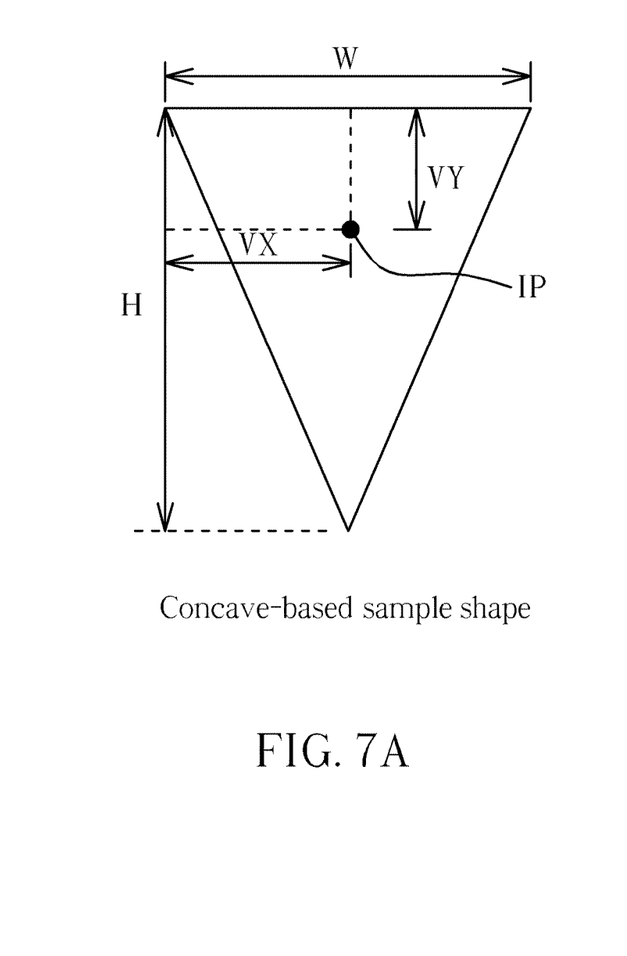
FIG. 7A is a schematic diagram of position of the internal point inside a concave-based effective sample shape.
Figure 7B:
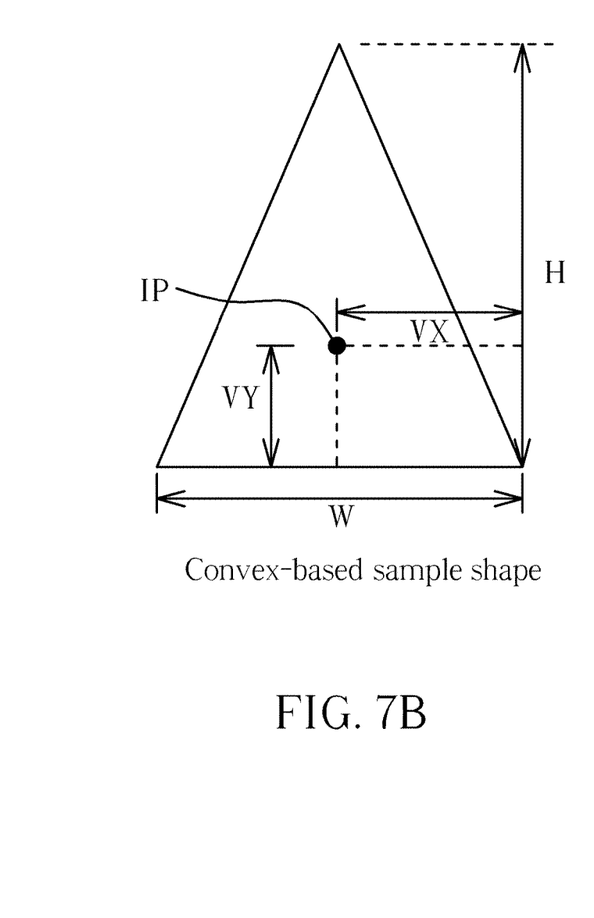
FIG. 7B is a schematic diagram of position of the internal point inside a convex-based effective sample shape.

In step S209, since the effective sample shapes SP1 to SPN can be generated, the system 100 can reduce noise effect since no redundant sample shape is introduced when the portion of the first curve C1 is higher than the upper bound UB or lower than the lower bound LB. In step S210, the processor 11 identifies an internal point of each effective sample shape. FIG. 7A is a schematic diagram of position of the internal point IP inside a concave-based effective sample shape. FIG. 7B is a schematic diagram of position of the internal point IP inside a convex-based effective sample shape. Here, the effective sample shape can be a convex-based sample shape or a concave-based sample shape. In the previous step S209, the height H and the width W of each effective sample shape are calculated. In step S210, the processor 11 can identify an internal point IP of each effective sample shape according to a proportion of the height H and width W. For example, the internal point IP of each effective sample shape can be positioned according to a length VX on X-axis and a length VY on Y-axis. Specifically, a ratio of the length VX and the width W can be equal to ½. A ratio of the length VY and the height H can be equal to ⅖. However, the processor 11 can identify the internal point IP of the effective sample shape according to any predetermined proportion of the height H and width W. Also, the internal point IP can be a centroid point or an incenter point of the sample shape. Further, an offset between a top vertex of the convex-based sample shape and a maximum value PMAX1 selected in FIG. 6C falls into a tolerable distance. For example, 5% of height H3 can be defined as the tolerable distance. An offset between a bottom vertex of the concave-based sample shape and a minimum value PMIN1 selected in FIG. 6D falls into a tolerable distance. For example, 5% of height H6 can be defined as the tolerable distance.

Figure 8:
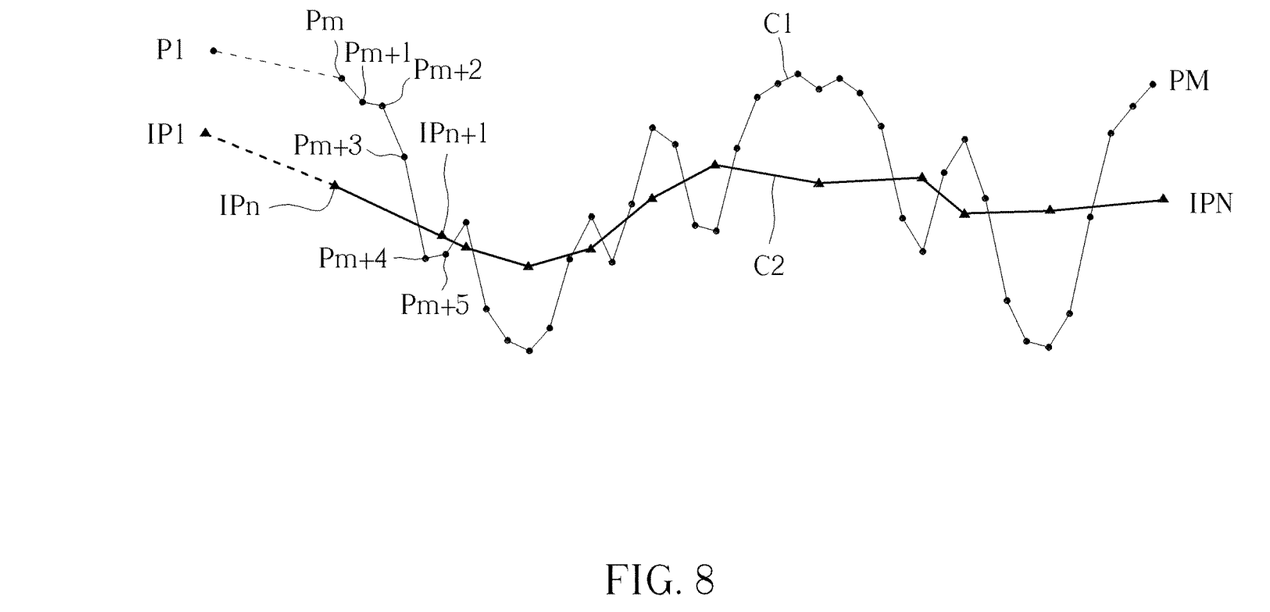
FIG. 8 is a schematic diagram of a second curve generated by interpolating all internal points of effective sample shapes.

In step S211, the processor 11 generates a second curve C2 by interpolating all internal points IP1 to IPN. Here, the interpolation process can be a linear interpolation process or a non-linear interpolation process. FIG. 8 shows a schematic diagram of a second curve C2 generated by interpolating all internal points IP1 to IPN of effective sample shapes. Specifically, the second curve C2 can be a linear curve generated by the linear interpolation process. The second curve C2 can also be a non-linear curve generated by a cubic interpolation, a polynomial interpolation, or a spline interpolation. For presentation simplicity, the second curve C2 here is considered as the linear curve in FIG. 8. The second curve C2 may be a non-monotonic function since positions of the internal points of sample shapes (i.e., effective sample shapes) may be dynamically changed. In other words, the second curve C2 correlates with all effective sample shapes.

Figure 9:
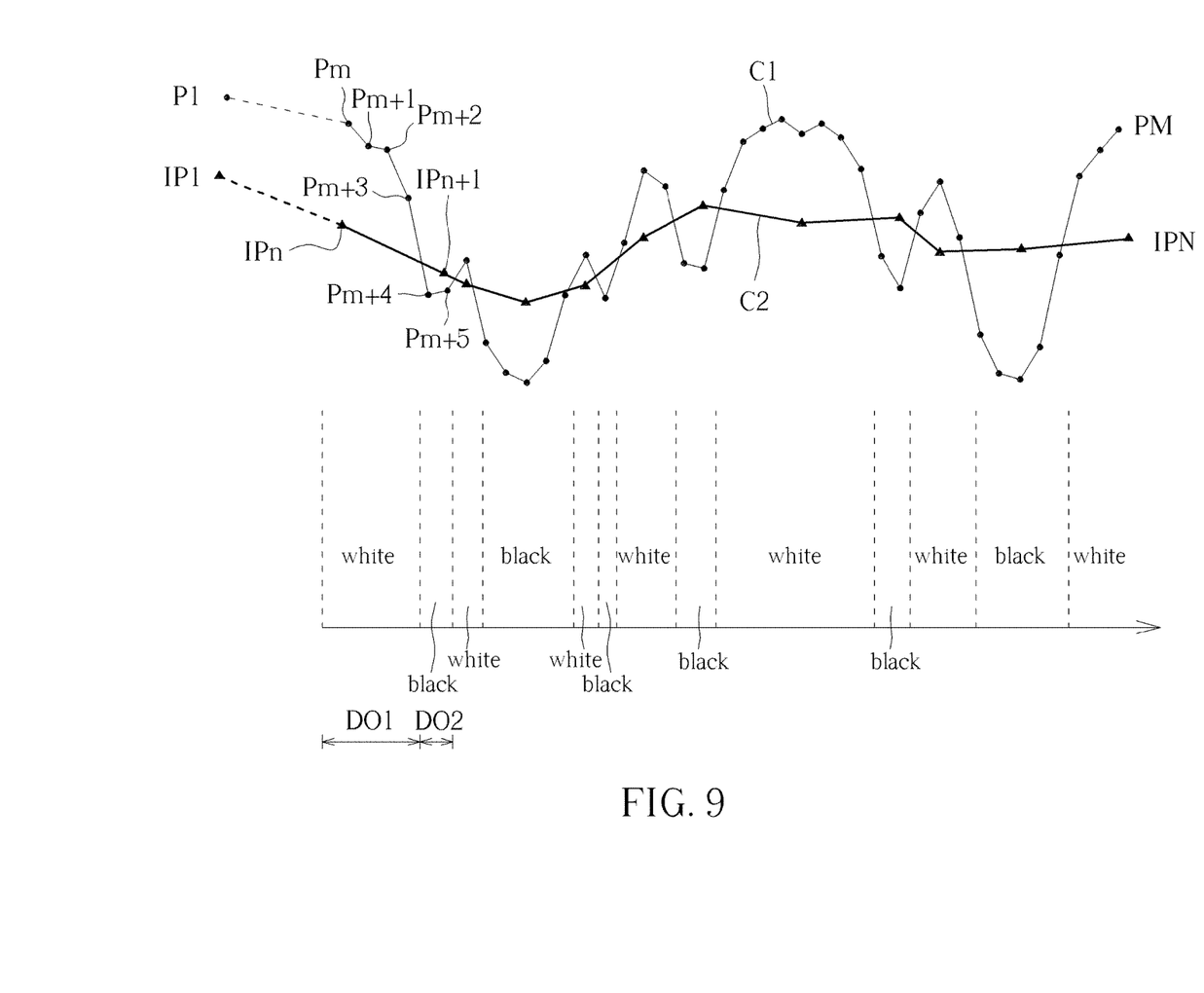
FIG. 9 is a schematic diagram of a digitizing process.

In step S212, the processor 11 digitizes the barcode image to binary data by comparing the sample data with the second curve C2. FIG. 9 illustrates a schematic diagram of a digitizing process. In FIG. 9, when the second curve C2 is given, gray levels of the sample point P1 to PM are compared with the second curve C2. Then, the system 100 can generate digitization data. For example, the sample points Pm, Pm+1, Pm+2, and Pm+3 are above the second curve C2. A domain DO1 of the first curve C1 including the sample points Pm, Pm+1, Pm+2, and Pm+3 is defined as a white portion (i.e., space portion). The sample points Pm+4 and Pm+5 are below the second curve C2. A domain DO2 of the first curve C1 including the sample points Pm+4 and Pm+5 is defined as a black portion (i.e., bar portion). In other words, the second curve C2 is regarded as a dynamic threshold for digitizing the barcode image into two decision hypotheses.

Figure 10:
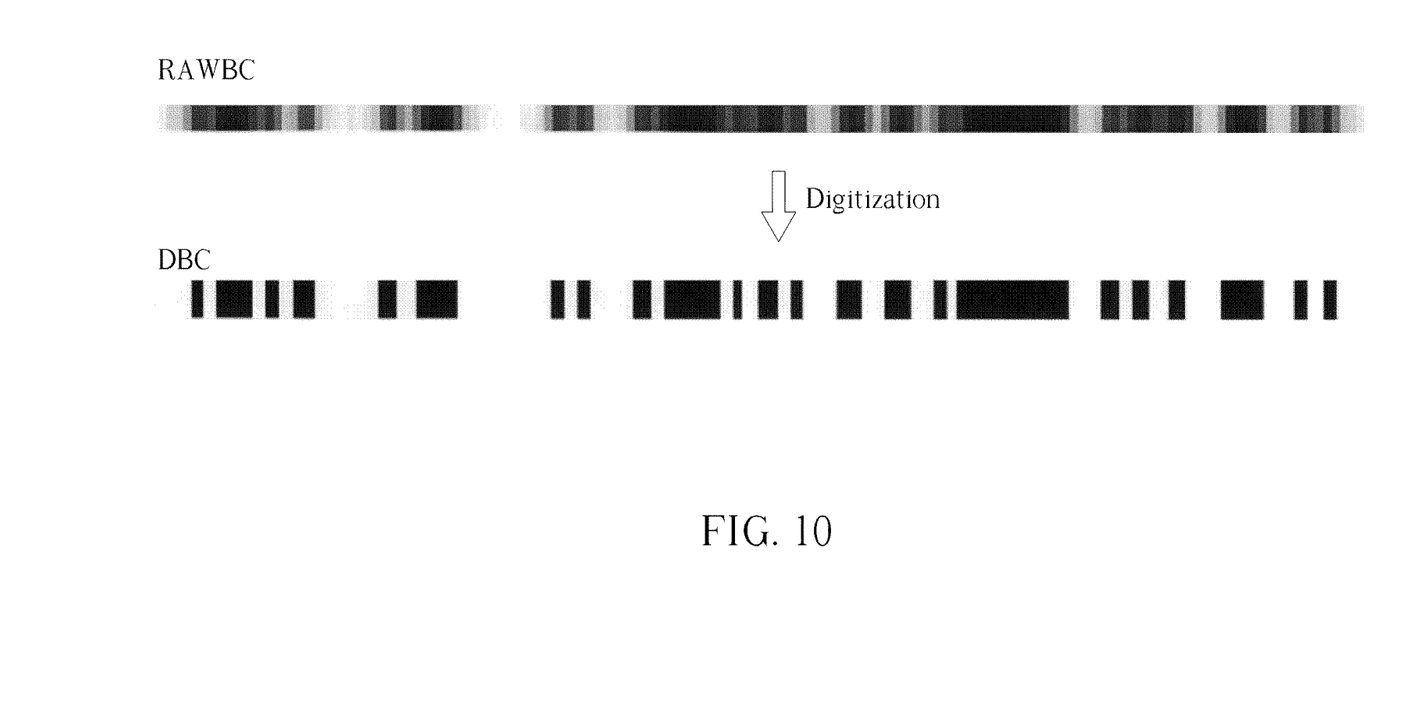
FIG. 10 is a schematic diagram of an effect of the digitizing process between an original barcode image and a digitized barcode image.

FIG. 10 illustrates a schematic diagram of an effect of the digitizing process between an original barcode image RAWBC and a digitized barcode image DBC. In FIG. 10, the original barcode image RAWBC may introduce noise effect, image shaky effect, and blur effect. After digitizing the barcode image into two decision hypotheses (i.e., a decision hypothesis of bar portion and a decision hypothesis of space portion) in step S212, the digitized barcode image DBC has no interference effect. Thus, the digitized barcode image DBC has very low decoding error rate. Specifically, the processor 11 can also use binary representation for outputting the digitized data. For example, the processor 11 can use a first binary value "1" to represent space portion. The processor 11 can use a second binary value "0" to represent bar portion. As a result, the digitized barcode image DBC can be represented as a binary sequence. The processor 11 can decode the binary sequence for extracting data and outputs data by using the output device 13. For example, the processor 11 can decode the binary sequence "110101101" by using codeword tables with respect to Code 39, Code 128, etc. After decoding and processing the binary sequence "110101101", the processor 11 can extract useful information. For example, finally, the processor 11 can acquire a price of product corresponding to the digitized barcode image DBC. However, the prevent invention is not limited to use the first binary value "1" for representing space portion and to use the second binary value "0" for representing bar portion. For example, in other embodiments, the first binary value "1" can be used for representing bar portion. The second binary value "0" can be used for representing space portion.

As mentioned in FIG. 3A and FIG. 3B, the barcode image can include the barcode portion BC and the peripheral region PR. When the sample line is generated across the barcode image (i.e., in FIG. 3B), there is a possible that digitized data of the sample line at marginal position is relevant to the peripheral region PR. To improve the decoding accuracy, a mechanism for determining an address of initially decoding bit can be introduced to ignore binary data on the peripheral region PR, such as a match filter mechanism or a correlator mechanism. For example, when a digitized binary sequence "11111111101011011111" is given and the binary sequence "110101101" is valid, the match filter can use a moving window to compare all possible valid binary sequences with the digitized binary sequence. When the binary sequence is matched to a certain sub-sequence of the digitized binary sequence, useful information (i.e., the price of product) is finally extracted.

To sum up, the present invention discloses a system for digitizing a barcode image. The system generates a dynamic threshold for digitizing the barcode image into bar portion and space portion. Specifically, the dynamic threshold is determined by a plurality of sample points. By using the digitizing process with the dynamic threshold, a blurred barcode image can be recovered as an interference-free barcode image. Thus, the decoding error can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for digitizing a barcode image comprising:
capturing the barcode image by using an image sensor;
generating at least one sample line according to the barcode image;
acquiring sample data of the at least one sample line;
generating a first reference line;
generating a second reference line according to the sample data;
generating an upper bound of the second reference line according to the a difference between the first reference line and the second reference line and a first multiplier factor;
generating a lower bound of the second reference line according to the difference between the first reference line and the second reference line and a second multiplier factor;
generating a first curve by interpolating all sample points of the sample data;
generating a plurality of effective sample shapes of the first curve according to the upper bound and the lower bound of the second reference line;
identifying an internal point of each effective sample shape;
generating a second curve by interpolating all internal points; and
digitizing the barcode image to binary data by comparing the sample data with the second curve.

2. The method of claim 1, wherein the sample data comprises gray levels, a value of the upper bound is greater than a value of the lower bound, and the first multiplier factor and the second multiplier factor are positive values smaller than one.

3. The method of claim 1, further comprising:
detecting a location of the barcode image;
identify a peripheral region of the barcode image; and
generating a first reference line according to a gray level of the peripheral region of the barcode image.

4. The method of claim 1, further comprising:
detecting a location of the barcode image; and
generating a first reference line according to the sample data of the terminals of the at least one sample line.

5. The method of claim 1, wherein the sample data comprises gray levels, and generating the second reference line according to the sample data is generating the second reference line according to an average of the gray levels.

6. The method of claim 1, wherein a value of the upper bound is:

$$UBV = L2 + \alpha \times (L1 - L2);$$

wherein UBV is the value of the upper bound, L2 is a value of the second reference line, L1 is a value of the first reference line, and α is the first multiplier factor.

7. The method of claim 1, wherein a value of the lower bound is:

$$LBV = L2 - \beta \times (L1 - L2);$$

wherein LBV is the value of the lower bound, L2 is a value of the second reference line, L1 is a value of the first reference line, and β is the second multiplier factor.

8. The method of claim 1, wherein when a portion of the first curve is greater than the upper bound, within the portion only a maximum sample point is selected to generate an effective sample shape.

9. The method of claim 1, wherein when a portion of the first curve is lower than the lower bound, within the portion only a minimum sample point is selected to generate an effective sample shape.

10. The method of claim 1, wherein when a portion of the first curve is between the upper bound and the lower bound, within the portion aside from boundary points, only local maximum sample points and local minimum sample points are selected to generate effective sample shapes.

11. The method of claim 1, wherein identifying the internal point of each effective sample shape comprises:
acquiring a width and a height of the each effective sample shape; and
determining a position of the internal point according to a proportion of the width and a proportion of the height.

12. The method of claim 11, wherein when an effective sample shape is a convex-based sample shape, the height is a vertical distance between a local maximum sample point and a base horizontally extended from a local minimum sample point, and the width is a length of the base, the local minimum sample point being one which has a higher value of two local minimum sample points.

13. The method of claim 11, wherein when an effective sample shape is a concave-based sample shape, the height is a vertical distance between a local minimum sample point and a base horizontally extended from a local maximum sample point, and the width is a length of the base, the local maximum sample point being one which has a lower value of two local maximum sample points.

14. The method of claim 11, wherein when an effective sample shape is a convex-based sample shape and a portion of the first curve is greater than the upper bound, the height is a vertical distance between a maximum sample point and a base horizontally extended from a local minimum sample point, and the width is a length of the base, the local minimum sample point being one which has a higher value of two local minimum sample points lower than the upper bound.

15. The method of claim 11, wherein when an effective sample shape is a concave-based sample shape and a portion of the first curve is lower than the lower bound, the height is a vertical distance between a minimum sample point and a base horizontally extended from a local maximum sample point, and the width is a length of the base, the local maximum sample point being one which has a lower value of two local maximum sample points higher than the lower bound.

16. The method of claim 1, wherein digitizing the barcode image to the binary data by comparing the sample data and the second curve comprises:
when a sample point of the at least one sample line is above the second curve, outputting a first binary value; and
when a sample point of the at least one sample line is below the second curve, outputting a second binary value.

17. A system for digitizing a barcode image, comprising:
an image sensor configured to capture the barcode image;
a memory configured to save sample data;
an output device configured to output decoded data; and
a processor coupled to the image sensor, the memory, and the output device and configured to process the barcode image;
wherein after the barcode image is captured by the image sensor, the processor generates at least one sample line according to the barcode image, the processor acquires the sample data of the at least one sample line and saves the sample data to the memory, the processor generates a first reference line, the processor generates a second reference line according to the sample data, the processor generates an upper bound of the second reference line according to a difference between the first reference line and the second reference line and a first multiplier factor, the processor generates a lower bound of the second reference line according to the difference between the first reference line and the second reference line and a second multiplier factor, the processor generates a first curve by interpolating all sample points of the sample data, the processor generates a plurality of effective sample shapes of the first curve according to the upper bound and the lower bound of the second reference line, the processor identifies an internal point of each effective sample shape, the processor generates a second curve by interpolating all internal points, the processor digitizes the barcode image to binary data by comparing the sample data with the second curve, and the processor decodes the binary data and controls the output device to output the decoded data.

18. The system of claim 17, wherein the sample data comprises gray levels, a value of the upper bound is greater than a value of the lower bound, and the first multiplier factor and the second multiplier factor are positive values smaller than one.

19. The system of claim 17, wherein when a portion of the first curve is greater than the upper bound, within the portion only a maximum sample point is selected to generate an effective sample shape.

20. The system of claim 17, wherein when a portion of the first curve is lower than the lower bound, within the portion only a minimum sample point is selected to generate an effective sample shape.

* * * * *

UNITED STATES PATENT AND TRADEMARK OFFICE
CERTIFICATE OF CORRECTION

PATENT NO. : 9,519,817 B1  
APPLICATION NO. : 15/241047  
DATED : December 13, 2016  
INVENTOR(S) : Chi-Cheng Lin and Tsung-Hsi Lee Page 1 of 1

It is certified that error appears in the above-identified patent and that said Letters Patent is hereby corrected as shown below:

On the Title Page

Under item (22), insert:  
--(30) Foreign Application Priority Data  
Aug. 03, 2016 (CN).....................201610629313.2--.

Signed and Sealed this  
Twenty-first Day of February, 2017

Michelle K. Lee  
*Director of the United States Patent and Trademark Office*